United States Patent [19]
Pontarollo

[11] Patent Number: 5,825,163
[45] Date of Patent: Oct. 20, 1998

[54] DC-TO-DC CONVERTER WITH LOW SUPPLY VOLTAGE

[75] Inventor: Serge Pontarollo, Saint Martin le Vinoux, France

[73] Assignee: SGS-Thomson Microelectronics S.A., Saint Genis, France

[21] Appl. No.: 788,793

[22] Filed: Jan. 24, 1997

[30] Foreign Application Priority Data

Jan. 26, 1996 [FR] France .................................. 96 01180

[51] Int. Cl.⁶ ..................................................... G05F 1/10
[52] U.S. Cl. ............................................................. 323/222
[58] Field of Search .................... 323/222, 282; 363/21

[56] References Cited

U.S. PATENT DOCUMENTS

| | | | |
|---|---|---|---|
| 5,313,382 | 5/1994 | Farrington | 323/222 |
| 5,367,247 | 11/1994 | Blocher et al. | 323/222 |
| 5,659,241 | 8/1997 | Horiuchi et al. | 323/222 |
| 5,677,617 | 10/1997 | Tokai et al. | 323/222 |

FOREIGN PATENT DOCUMENTS

A-2 249 226  4/1992  United Kingdom ............ H02M 7/42

OTHER PUBLICATIONS

Patent Abstracts of Japan, vol. 015, No. 240 (E–1079), Jun. 20, 1991 & JP–A–03 074169 (Fuji Electric Co. Ltd.).

*Primary Examiner*—Stuart N. Hecker
*Attorney, Agent, or Firm*—Wolf, Greenfield & Sacks, P.C.

[57] ABSTRACT

A DC-to-DC converter includes an inductor and a diode that are connected in series between a positive supply terminal and a positive output terminal, and a storage capacitor connected between the positive output terminal and a negative terminal. The DC-to-DC converter further includes a first switch including a lateral MOS transistor connected between the anode of the diode and the negative terminal, a second switch including a vertical MOS transistor connected in parallel to the first switch, a first active load circuit connected between the positive and negative supply terminals and designed to control the first switch, a second active load circuit connected between the positive output terminal and the negative terminal and designed to control the second switch, and an oscillator providing a periodic signal for controlling the active loads.

27 Claims, 3 Drawing Sheets

DC-TO-DC CONVERTER WITH LOW SUPPLY VOLTAGE

BACKGROUND OF THE INVENTION

1. Field of the Invention

The present invention relates to so called switched mode "charge pump" DC-to-DC converters, designed to provide a voltage higher than a supply voltage received at their input. The invention more particularly applies to the operation and the start-up of a DC-to-DC converter at a low supply voltage.

2. Discussion of the Related Art

FIG. 1 partially represents, in block diagram form, an exemplary conventional DC-to-DC converter.

The converter includes two input terminals, one of which, P, is more positive than the other, M, which receive a DC supply voltage Vdd. Terminal M is generally a ground terminal. An inductor L is connected in series with a diode D between terminal P and a first positive output terminal AUX of the converter. A second output terminal of the converter is formed by terminal M. A storage capacitor C is placed between terminals AUX and M. A switch K is connected between terminal M and the junction node A between inductor L and diode D. Switch K is controlled by an oscillator (OSC) 1 which provides a rectangular signal fixing the on and off periods of switch K. The oscillator 1 is supplied by voltage Vdd.

The switch is generally formed by a vertical MOS transistor (VDMOS), the control signal provided by oscillator 1 being applied to the gate G of the VDMOS transistor. The use of MOS techniques to form switch K is due especially to the fact that a MOS transistor causes less current loss than a bipolar transistor during switching, because of its speed, and that a MOS transistor requires less input power because it is voltage controlled.

A VDMOS transistor is used because of the increase in output voltage Vaux achieved by the circuit. A conventional lateral MOS transistor can only operate, because of its technological limitations, with output voltages lower than approximately 15 volts, whereas a VDMOS transistor can withstand up to 60 volts at its drain when it is off. In addition, a VDMOS transistor withstands high currents (up to approximately 1 A) with a low drain-source on resistance (approximately 4 ohms). The current flowing through switch K at the end of each on period of switch K can reach very high values, depending upon the supply voltage, the inductor value and the on time of switch K. For example, with an 18-volt supply voltage Vdd, an inductor L of approximately 100 μH and an on time of switch K of approximately 5 μs, the current can reach approximately 900 mA in the VDMOS transistor. Such a current would require an oversized lateral MOS transistor (the width of its gate should be approximately 45 mm for a length of approximately 5 μm).

During the periods when switch K is on, inductor L stores an energy which is restored to capacitor C and to a load (not shown), which is connected to terminals AUX and M, during the periods where switch K is off. Capacitor C supplies the load outside the periods where the inductor L restores a current to the load. Capacitor C is selected with a sufficient capacitance to permit the circuit to operate as a voltage elevator. A regulator 2 is generally connected between terminal AUX and a terminal 3 for controlling the oscillator. The regulator 2 is designed to interrupt the control signal provided by the oscillator 1 when voltage Vaux reaches a desired value.

The operation as a voltage elevator of a circuit, such as represented in FIG. 1, depends upon the size of the various components, particularly of inductor L and capacitor C, and upon the on periods of switch K.

A drawback of a conventional converter is due to the threshold-voltage of the VDMOS transistor, which is substantially 2.6 volts at 25° C. Indeed, the converter cannot operate if the supply voltage Vdd does not exceed the threshold-voltage of the VDMOS transistor. In addition, the threshold-voltage of the VDMOS transistor varies as a function of the operation temperature. For example, at 25° C., the threshold voltage is approximately 2.6 volts whereas the threshold voltage is 2.92 volts at −55° C. As a result, for a supply voltage Vdd of 2.7 volts, which is the minimum supply voltage of a large number of standard circuits, the converter does not start-up at −55° C.

A further drawback of a circuit, such as represented in FIG. 1, is that the time required for the voltage Vaux to reach a desired value higher than the supply voltage Vdd is very long if the supply voltage Vdd is only slightly higher than the threshold voltage of the VDMOS transistor (for example, a supply voltage of 2.7 volts at 25° C.). Although the VDMOS transistor is sized to withstand high currents (while remaining within its ohmic operation) when its gate-source voltage (therefore its supply voltage) is high, for a low gate-source voltage of the transistor, the current is low (approximately 15 mA) and the drain-source on resistance is high, which limits the quantity of energy that can be stored in inductor L at each on period of switch K. In addition, this limits the power available at the output.

SUMMARY OF THE INVENTION

An object of the present invention is to avoid the drawbacks of conventional DC-to-DC converters by providing a converter that can operate with a low supply voltage, which can be as low as approximately 2 volts.

To achieve this object, the present invention provides a DC-to-DC converter including:

an inductor and a diode that are connected in series between a positive supply terminal and a positive output terminal;

a storage capacitor connected between the positive output terminal and a negative terminal;

a first switch comprised of a lateral MOS transistor connected between the anode of the diode and the negative terminal;

a second switch comprised of a vertical MOS transistor connected in parallel to the first switch;

a first active load circuit connected between the positive and negative supply terminals and designed to control the first switch;

a second active load circuit connected between the positive output terminal and the negative terminal and designed to control the second switch; and an oscillator providing a periodic signal for controlling the active loads.

According to an embodiment of the present invention, the converter includes means for limiting the gate-source voltage of the vertical MOS transistor.

According to an embodiment of the present invention, the converter includes means for limiting the current flowing through the lateral MOS transistor.

According to an embodiment of the present invention, the means for limiting the current include at least one bipolar transistor connected between the anode of the diode and the drain of the lateral MOS transistor, the base of the bipolar transistor receiving a constant current.

According to an embodiment of the present invention, the means for limiting the current are formed by a Darlington circuit including bipolar transistors whose current is fixed by a constant current source.

According to an embodiment of the present invention, the converter includes means for limiting the gate-source voltage of the lateral MOS transistor.

The foregoing and other objects, features, aspects and advantages of the invention will become apparent from the following detailed description of the present invention when taken in conjunction with the accompanying drawings.

BRIEF DESCRIPTION OF THE DRAWINGS

For the sake of clarity, the same elements are designated with the same reference characters in the various figures. Additionally, the time diagrams of FIG. 4 are not drawn to scale.

DETAILED DESCRIPTION

Figure 1:
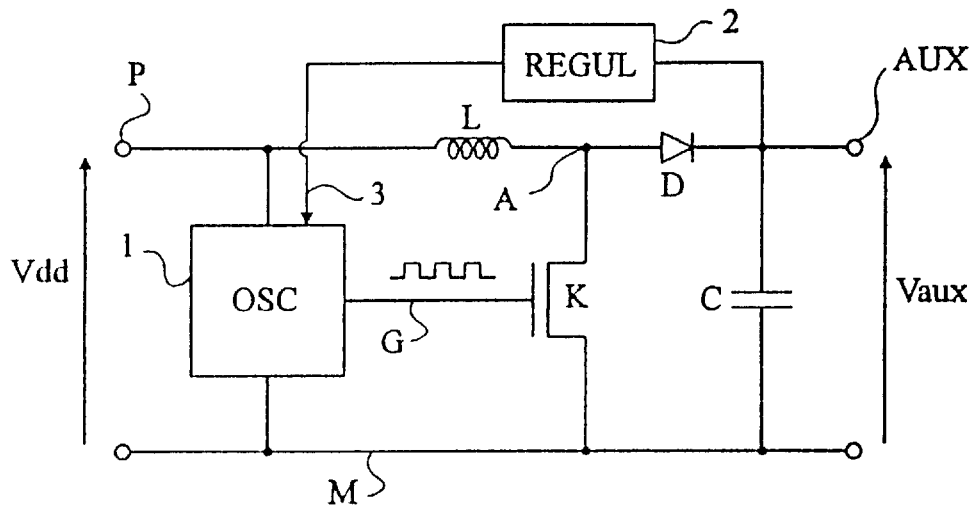
FIG. 1, described above, discloses the state of the art and the problem to be solved.
Figure 2:
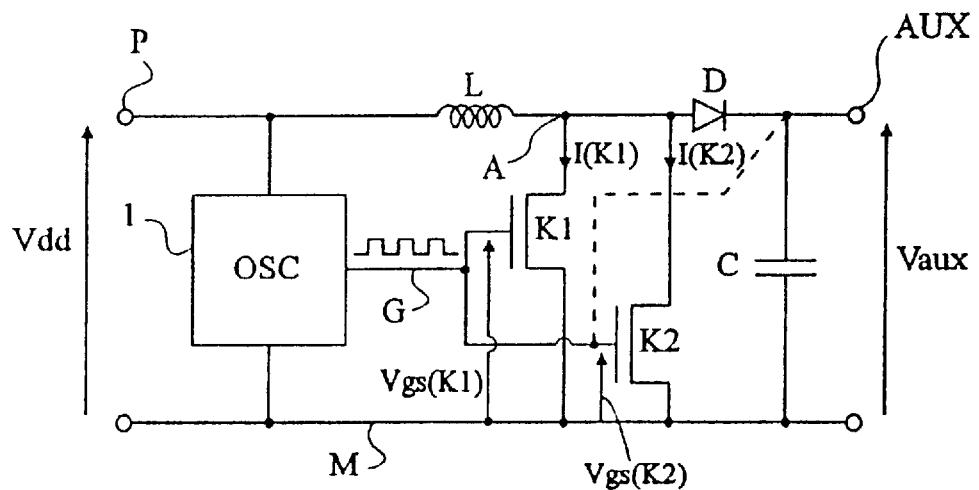
FIG. 2 represents an embodiment of a DC-to-DC converter according to the present invention.

As represented in FIG. 2, a DC-to-DC converter according to the invention includes, as that of FIG. 1, an inductor L connected in series with a diode D between a d.c. positive supply terminal P and a positive output terminal AUX, as well as an oscillator 1 and a storage capacitor C.

According to the present invention, a first switch K1, formed by a lateral MOS transistor, is connected between anode A of diode D and terminal M. A second switch K2, formed by a vertical MOS transistor (VDMOS), is connected in parallel with switch K1. Switches K1 and K2 are controlled from a rectangular periodic signal Vg provided by an output terminal G of oscillator 1.

A distinctive feature of the present invention is that the gate voltage of the lateral MOS transistor K1 varies between the positive voltage Vdd of the supply voltage and ground, whereas the gate voltage of the vertical MOS transistor K2 varies between the positive voltage of the output voltage Vaux and ground (as symbolized by dotted lines in FIG. 2).

Switch K1 forms a start-up switch of the converter according to the invention, since the threshold voltage of a lateral MOS transistor is substantially lower than the threshold voltage of a vertical MOS transistor. For example, the threshold voltage Vth(K1) of transistor K1 is approximately 1.2 volts whereas the threshold voltage Vth(K2) of transistor K2 is approximately 2.6 volts.

Thus, as long as voltage Vaux is lower than voltage Vth(K2), only switch K1 operates to progressively increase the voltage at point A and, as a consequence, the output voltage Vaux.

Figure 3:
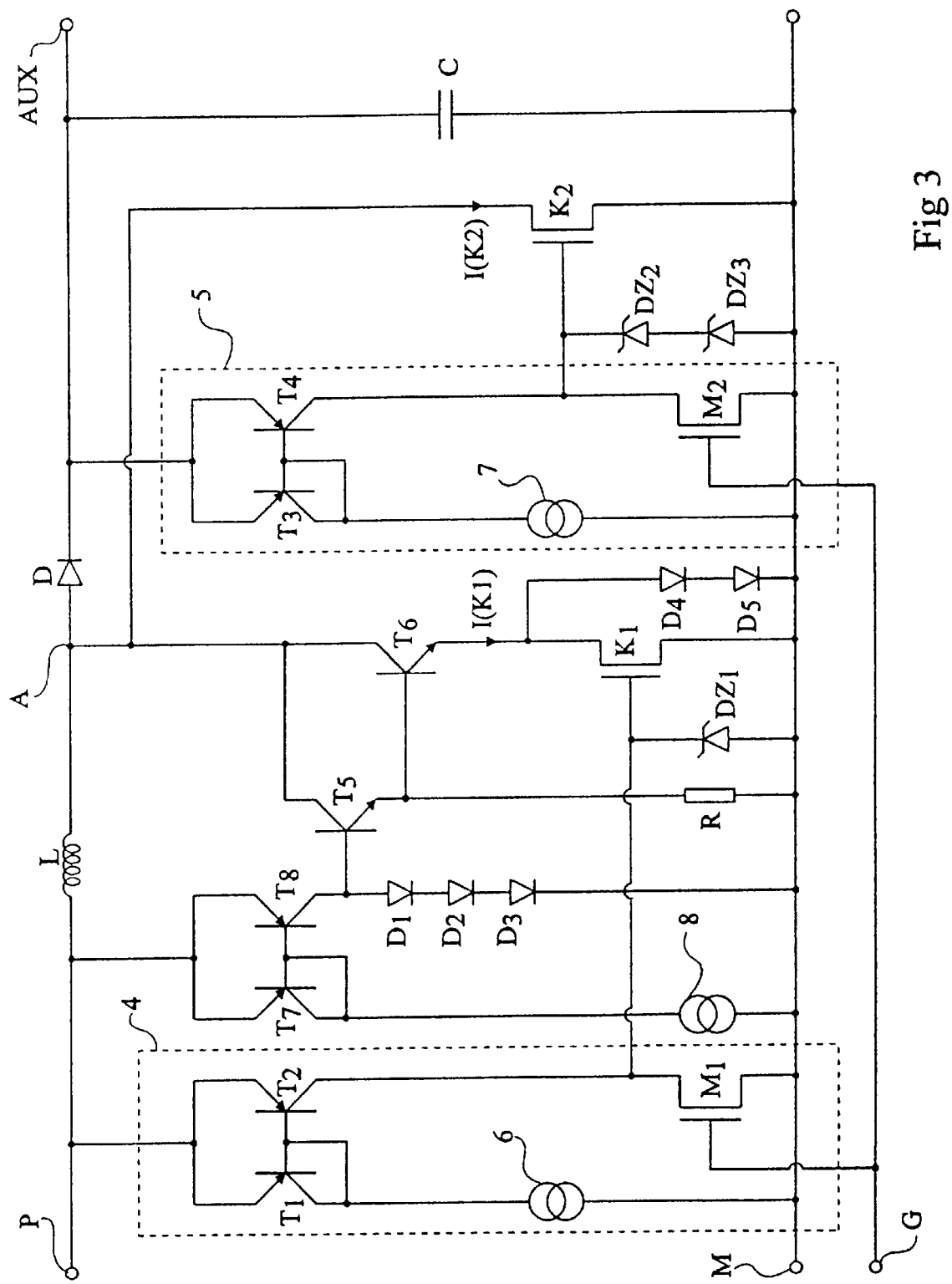
FIG. 3 is a detailed electric diagram of an embodiment of the converter represented in FIG. 2.
Figure 4:
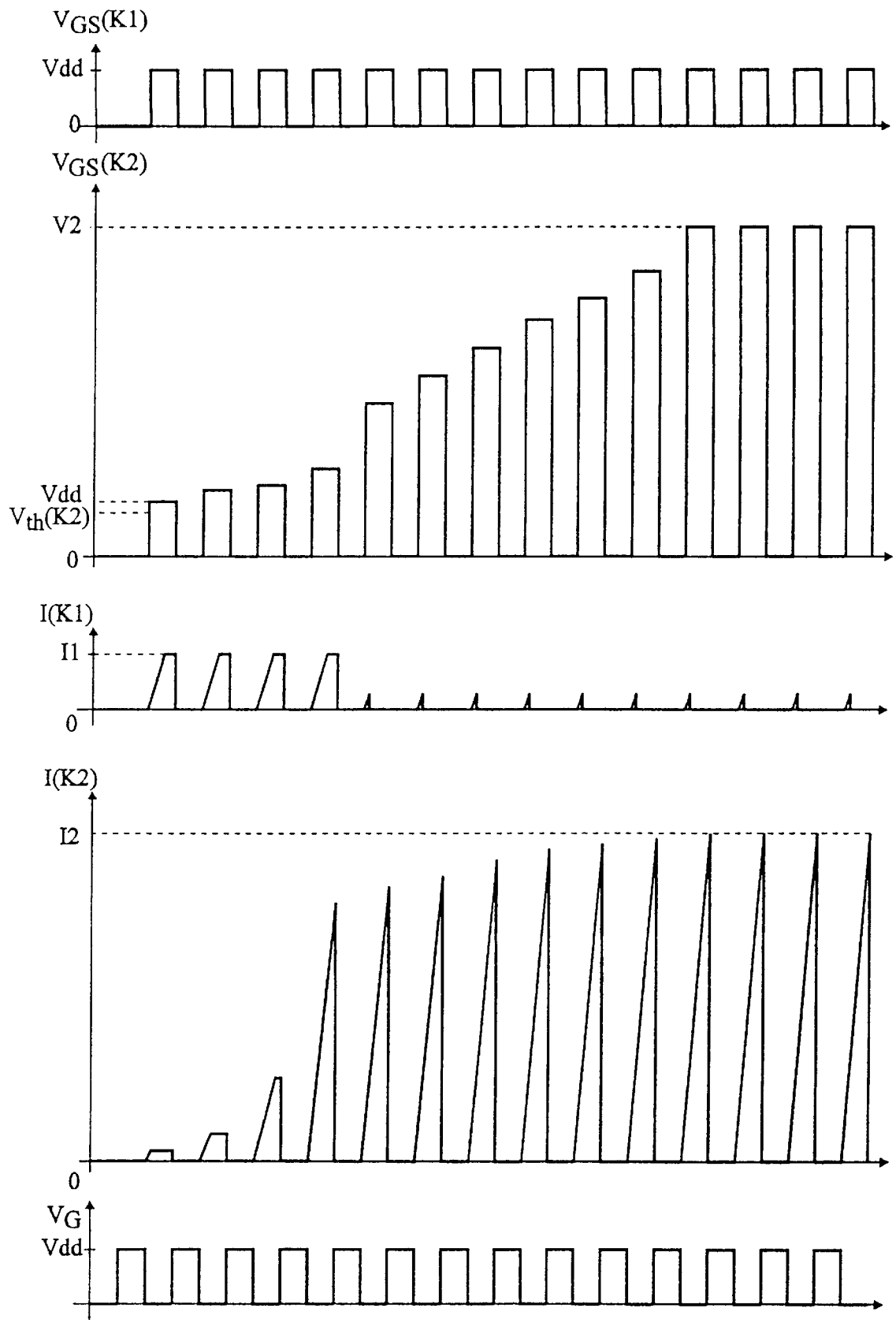
FIG. 4 illustrates, in the form of timing diagrams, the operation of the converter according to the present invention.

The operation of a converter according to the invention will be better understood with relation to FIGS. 3 and 4. FIG. 3 represents a detailed electric diagram of an embodiment of a converter as represented in FIG. 2. FIG. 4 represents, in the form of time diagrams, the control voltage Vg, the gate-source voltages Vgs of switches K1 and K2, and currents I(K1) and I(K2) flowing through these switches.

The control signal Vg, provided by terminal G of oscillator 1 (not shown in FIG. 3), is applied to the gates of transistors K1 and K2 through active load circuits 4 and 5. A first circuit 4 is associated with the lateral MOS transistor K1. Circuit 4 includes a bipolar transistor T1 connected in series with a first constant current source 6 between terminal P and terminal M. Transistor T1 is diode-connected and a bipolar transistor T2, connected in series with a lateral MOS transistor M1 between terminal P and terminal M, is current-mirror connected with transistor T1. The collector of transistor T2 is connected to the drain of transistor M1 and to the gate of transistor K1, whereas the gate of transistor M1 is connected to terminal G. A second circuit 5, of a similar structure and including bipolar transistors T3 and T4, a second constant current source 7 and a lateral MOS transistor M2, is connected between terminals AUX and M and is associated with the vertical transistor K2. The active load circuits 4 and 5 are conventional circuits and a circuit similar to circuit 4 is generally used to control the vertical MOS transistor K of the circuit of FIG. 1. It should be remarked that the signal applied to the gates of transistors K1 and K2 are inverted with respect to the control signal Vg provided by oscillator 1.

Transistor K1 is associated with a protection device which limits the voltage across its terminals and the current flowing therethrough. This device is formed by a "Darlington" circuit including bipolar transistors T5 and T6 interposed between terminal A and the drain of transistor K1. A third constant current source 8, connected in series with a bipolar transistor T7 between terminal P and terminal M, is used to fix the base current of transistor T5 through a bipolar transistor T8 current-mirror connected with transistor T7, in turn connected as a diode. A high value resistor R is connected between the emitter of transistor T5, therefore the base of transistor T6, and terminal M. Thus, the current source 8 and transistors T5, T6, T7 and T8 fix the maximum current I1 (FIG. 4) that can flow through transistor K1 when energy is stored in inductor L. Three diodes, D1, D2 and D3, bias transistor T5 by fixing the voltage of its base to three PN junction voltages. As a result, when the Darlington circuit is conductive, i.e., during the on periods of transistor K1, the voltage across transistor K1 is limited to one PN junction voltage. Thus, transistor K1 is protected, even when the voltage at A becomes close to the desired steady state voltage Vaux. It should be remarked that the number of transistors of the Darlington circuit depends upon the maximum current that is to be fixed for transistor K1. It should also be remarked that the Darlington circuit can be replaced with a single bipolar transistor whose base current is fixed by a constant current source.

To avoid, when switching off switch K1, that the abrupt voltage variation at A, which is transmitted to the drain of transistor K1 by the collector/emitter capacitance of transistor T6, generates too high a voltage across transistor K1, two diodes D4 and D5 are serially connected between the drain of transistor K1 and terminal M. Thus, diodes D4 and D5 limit the voltage across transistor K1 to two junction voltages when the Darlington circuit does not conduct.

The gate of transistor K1 is protected by a Zener diode DZ1 connected between gate and source.

The active load circuit 5 associated with transistor K2 operates to duplicate, on the gate of transistor K2, a periodic signal corresponding to the signal provided by oscillator 1, but with limit voltages which correspond to the respective voltages of terminal AUX and terminal M.

The gate voltage of transistor K2 is limited by Zener diodes DZ2 and DZ3, which are connected so that their cumulated threshold voltage V2 is significantly higher than voltage Vth(K2).

In the example represented in FIG. 4, it is assumed that the threshold voltage of transistor K2 is slightly lower than the supply voltage Vdd.

As long as voltage Vgs(K2) has not reached a sufficient value, i.e., as long as the output voltage Vaux of the circuit is not substantially higher than the threshold voltage of transistor K2, the drain-source on resistance of the transistor is very high, as in the case of a conventional circuit. In contrast, transistor K1, which has a substantially lower threshold voltage (approximately 1 volt), can be suitably controlled even though the supply voltage is lower than the threshold voltage of transistor K2. The switching-on of transistor K1 generates a linear increase in the current flowing therethrough until it reaches value I1 fixed by the current source 8. At the switching-off of transistor K1 (and of transistor K2), the energy stored in inductor L is transferred to capacitor C, which causes the output voltage Vaux to increase.

The current flowing through transistor K2 progressively increases during the first periods of the control signal with the progressive decrease of the drain-source on resistance of transistor K2 further to the progressive increase of its gate-source voltage.

When voltage Vgs(K2) becomes sufficient for the drain-source resistance of transistor K2 to be significantly lower than the drain-source on resistance of transistor K1 (which, in contrast, is constant because the gate of transistor K1 is always connected to a voltage of same value, approximately equal to Vdd), practically all the current flowing through inductor L crosses transistor K2. As illustrated in FIG. 4, a slight current continues to flow through transistor K1 at each beginning of the on period of transistors K1 and K2, because of the higher switching speed of transistor K1 with respect to transistor K2.

In steady state, the gate-source voltage of transistor K2 is fixed by voltage V2 corresponding to the cumulated thresholds of Zener diodes DZ2 and DZ3.

In a specific example, a converter such as represented in FIG. 3 can be formed by components having the following values:

W/L(K1)=3000/4;
DZ1, DZ2, DZ3=5.5 V;
R=100 kΩ;
I6=20 mA;
I7=20 mA;
I8=100 mA;
L=100 µH; and
C=100 nF.

The minimum supply voltage, allowing the operation of the converter according to the invention, corresponds to the highest voltage among the threshold voltage of transistor K1 and the cumulated threshold voltage of the diodes which are connected between the collector of transistor T8 and terminal M. Therefore, the minimum voltage depends upon the number of transistors of the Darlington circuit. In the given example, the minimum operation voltage is three junction voltages, i.e., approximately 2.1 volts at 25° C.

The present invention advantageously enables start-up of a DC-to-DC converter independently of the supply voltage Vdd and the threshold voltage of the vertical MOS transistor K2.

Another advantage of the present invention is that, in steady state, it is ensured that transistor K2 has a very low drain-source on resistance by generating a high gate-source voltage which is independent of the supply voltage Vdd.

A further advantage of the present invention is that, by using the lateral transistor K1, the output voltage Vaux increases significantly more rapidly than when a vertical transistor is used, in the case of a supply voltage slightly higher than the threshold voltage of transistor K2. The drain-source on resistance is inversely proportional to the difference between the gate-source voltage and the threshold voltage of the transistor.

Since the gate-source voltage of transistor K2 is fixed independently of the supply voltage Vdd, the desired output voltage is very rapidly obtained, even with a low supply voltage Vdd.

In addition, with a low supply voltage, the value of the maximum current I2 that may flow through transistor K2 can be increased, which permits, for a same inductor L, a same frequency of the control signal and a same supply voltage, to obtain a significantly higher power at the output of the converter.

For example, assuming that the value of inductor L is 100 µH, that the frequency of the control signal is 100 kHz and that the supply voltage Vdd is 3 volts, the current flowing through transistor K2 at the end of each on period (which is assumed to be equal to one half-period of the control signal) is 120 mA whereas, under the same circumstances, it is only 1.5 mA in a conventional converter as represented in FIG. 1. Thus, the available power at the output of the converter is, in this case, 72 mW whereas it would be, for a conventional converter, 11.25 µW.

Thus, for a predetermined output power, the invention permits a decrease in the size of the VDMOS transistor K2.

As is apparent to those skilled in the art, various modifications can be made to the above disclosed preferred embodiments. In particular, the number of stages of the Darlington circuit depends upon the maximum desired current for transistor K1. Similarly, the number of diodes (D4, D5) for the voltage protection of transistor K1 can be modified. In addition, the size of the various transistors of the converter according to the invention can be determined by those skilled in the art and depends upon the desired characteristics of the converter.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A DC-to-DC converter including:
   an inductor and a diode that are connected in series between a positive supply terminal and a positive output terminal;
   a storage capacitor connected between said positive output terminal and a negative terminal;
   a first switch comprised of a lateral MOS transistor connected between the anode of said diode and said negative terminal;
   a second switch comprised of a vertical MOS transistor connected in parallel to said first switch;
   a first active load circuit connected between said positive and negative supply terminals and designed to control said first switch;

a second active load circuit connected between said positive output terminal and said negative terminal and designed to control the second switch; and an oscillator providing a periodic signal for controlling the active loads.

2. The converter of claim 1, including means for limiting the gate-source voltage of the vertical MOS transistor.

3. The converter of claim 1, including means for limiting a current flowing through the lateral MOS transistor.

4. The converter of claim 3 wherein said means for limiting the current include at least one bipolar transistor connected between an anode of said diode and the drain of said lateral MOS transistor, a base of said bipolar transistor receiving a constant current.

5. The converter of claim 4 wherein said means for limiting the current are formed by a Darlington circuit including bipolar transistors whose current is fixed by a constant current source.

6. The converter of claim 1, including means for limiting a gate-source voltage of the lateral MOS transistor.

7. A DC-to-DC converter comprising:

an inductance means and a unilateral conduction means connected in series at a common connection node;

a first supply terminal and first output terminal;

means connecting said inductance means and said unilateral conducting means between said first supply terminal and said first output terminal;

a common input/output terminal;

a storage capacitance means coupled between said first output terminal and said common terminal;

a first circuit means comprising a lateral transistor means coupled between said common connection node and said common terminal, and a first control circuit means for said lateral transistor means coupled between said first supply terminal and said common terminal;

a second circuit means comprising a vertical transistor means coupled between said common connection node and said common terminal, and a second control circuit means for said vertical transistor means coupled between said first output terminal and said common terminal; and an oscillator means providing a signal for controlling said first and second circuit means.

8. The converter of claim 7 wherein said lateral transistor means comprises a lateral MOS transistor.

9. The converter of claim 8 wherein said vertical transistor means comprises a vertical MOS transistor.

10. The converter of claim 9 wherein said first control circuit means comprises a first active load circuit.

11. The converter of claim 10 wherein said second control circuit means comprises a second active load circuit.

12. The converter of claim 11 wherein said oscillator means provides a periodic signal for controlling the active load circuits.

13. The converter of claim 7 including means for limiting the gate-source voltage of the vertical transistor means.

14. The converter of claim 7 including means for limiting a current flow through the lateral transistor means.

15. The converter of claim 14 wherein said means for limiting the current includes at least one bipolar transistor connected between said common connection node and the drain of said lateral transistor means.

16. The converter of claim 15 wherein the base of said bipolar transistor receives a constant current.

17. The converter of claim 16 wherein said means for limiting the current comprises a Darlington circuit including bipolar transistors.

18. The converter of claim 17 wherein the bipolar transistors of the Darlington circuit have their current fixed by a constant current source.

19. The converter of claim 7 wherein the lateral transistor means comprises a lateral MOS transistor further including means for limiting the gate-source voltage of the lateral MOS transistor.

20. A DC-to-DC converter comprising:

an inductance and a diode connected in series at a common connection node;

a positive supply terminal and a positive output terminal;

said inductance and said diode coupled between said positive supply terminal and said positive output terminal;

a negative terminal;

a storage capacitor coupled between said positive output terminal and said negative terminal;

a first circuit comprising a lateral MOS transistor coupled between said common connection node and said negative terminal, and a first control circuit for said lateral MOS transistor coupled between said positive supply terminal and said negative terminal;

a second circuit comprising a vertical MOS transistor coupled between said common connection node and said negative terminal, and a second control circuit for said vertical MOS transistor coupled between said positive output terminal and said negative terminal; and an oscillator providing a signal for controlling said first and second circuits.

21. The converter of claim 20 including a circuit for limiting the gate-source voltage of the vertical MOS transistor.

22. The converter of claim 20 including a circuit for limiting a current flow through the lateral MOS transistor.

23. The converter of claim 22 wherein the circuit for limiting the current includes at least one bipolar transistor connected between the connection node and the drain of the lateral MOS transistor.

24. The converter of claim 23 further including a current source coupled to the base of said bipolar transistor.

25. The converter of claim 24 wherein the circuit for limiting the current comprising a Darlington circuit including bipolar transistors.

26. The converter of claim 25 comprising a further constant current source coupled to the bipolar transistor of the Darlington circuit.

27. The converter of claim 20 including a circuit for limiting a gate-source voltage of the lateral MOS transistor.

* * * * *